(12) United States Patent
Tamburrino et al.

(10) Patent No.: US 11,316,358 B2
(45) Date of Patent: Apr. 26, 2022

(54) EXTENDING SHELF LIFE OF RECHARGEABLE BATTERIES

(71) Applicant: Iterna, LLC, Aurora, IL (US)

(72) Inventors: Peter Christ Tamburrino, Antioch, IL (US); Omar Tabbara, Lisle, IL (US)

(73) Assignee: Iterna, LLC, Bolingbrook, IL (US)

( * ) Notice: Subject to any disclaimer, the term of this patent is extended or adjusted under 35 U.S.C. 154(b) by 0 days.

(21) Appl. No.: 16/601,530

(22) Filed: Oct. 14, 2019

(65) Prior Publication Data

US 2020/0153253 A1 May 14, 2020

Related U.S. Application Data

(60) Division of application No. 15/409,529, filed on Jan. 18, 2017, now Pat. No. 10,447,056, which is a
(Continued)

(51) Int. Cl.
| | |
|---|---|
| *H02J 7/00* | (2006.01) |
| *H01M 10/44* | (2006.01) |
| *H01M 10/46* | (2006.01) |
| *H01M 6/50* | (2006.01) |
| *H01M 10/42* | (2006.01) |
| *H02J 7/34* | (2006.01) |
| *H01M 10/48* | (2006.01) |

(52) U.S. Cl.
CPC .......... *H02J 7/007* (2013.01); *H01M 6/5033* (2013.01); *H01M 10/4207* (2013.01); *H01M 10/441* (2013.01); *H01M 10/46* (2013.01); *H01M 10/488* (2013.01); *H02J 7/0021* (2013.01); *H02J 7/0047* (2013.01); *H02J 7/0063* (2013.01); *H02J 7/0069* (2020.01); *H02J 7/342* (2020.01); *H01M 2010/4271* (2013.01); *H02J 2007/0067* (2013.01)

(58) Field of Classification Search
USPC ........................................................ 320/103
See application file for complete search history.

(56) References Cited

U.S. PATENT DOCUMENTS

| | | | |
|---|---|---|---|
| 2008/0103557 A1* | 5/2008 | Davis ................... | A61N 1/3787 607/61 |
| 2013/0314047 A1* | 11/2013 | Eagle ................... | H02J 7/0086 320/127 |

(Continued)

*Primary Examiner* — Mohammed Alam
(74) *Attorney, Agent, or Firm* — Hojka Qadeer, LLC

(57) ABSTRACT

A hybrid battery system is provided for extending the shelf-life of rechargeable batteries. The hybrid battery system may contain sets of non-rechargeable and rechargeable batteries respectively. As the rechargeable batteries are discharged (e.g., from self-discharge), the hybrid battery system may utilize the non-rechargeable batteries to maintain the rechargeable batteries at a preferred state of charge. A preferred state of charge may be selected to extend the shelf-life of the rechargeable batteries. Alternatively, a signal may change the preferred state of charge to prepare the rechargeable batteries for use or for other reasons. The hybrid battery system may contain modular components, thereby allowing for easy replacement of defective or otherwise unsuitable non-rechargeable batteries, rechargeable batteries, or supporting electronics.

15 Claims, 1 Drawing Sheet

Related U.S. Application Data continuation-in-part of application No. PCT/US2015/041043, filed on Jul. 18, 2015.

(60) Provisional application No. 62/026,527, filed on Jul. 18, 2014.

(56) References Cited

U.S. PATENT DOCUMENTS

| | | | | |
|---|---|---|---|---|
| 2016/0020623 A1* | 1/2016 | Tamburrino | ........ | H01M 10/488 320/103 |
| 2020/0153253 A1* | 5/2020 | Tamburrino | ........ | H01M 10/441 |

\* cited by examiner

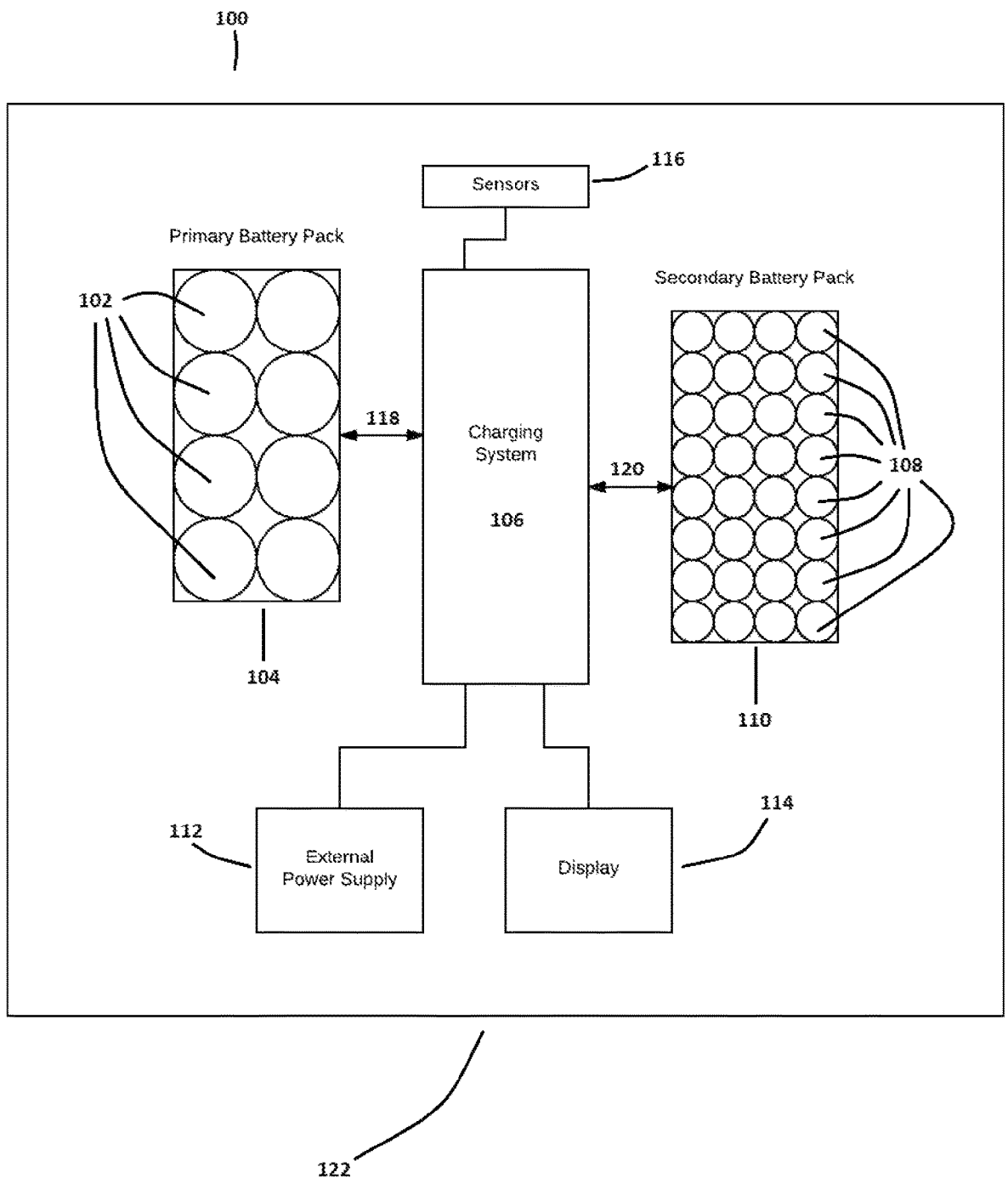

EXTENDING SHELF LIFE OF RECHARGEABLE BATTERIES

CROSS-REFERENCE TO RELATED APPLICATIONS

This application is a divisional of U.S. patent application Ser. No. 15/409,529, filed Jan. 18, 2017, which is a continuation-in-part of PCT Patent Application No. PCT/US2015/041043, filed Jul. 18, 2015, which claims the benefit of, and priority to, U.S. Provisional Patent Application Ser. No. 62/026,527, filed Jul. 18, 2014, the entire disclosures of which are incorporated herein by reference.

BACKGROUND

Field of the Invention

The present disclosure relates to devices and methods for extending the shelf life of rechargeable batteries.

Description of the Related Art

Modern battery technology is primarily focused on the use of primary cells or secondary cells, such as typical rechargeable cells, to comprise a primary or secondary battery.

Primary batteries may be useful in situations where a long shelf life is desirable. For example, many primary batteries may be able to remain unused for over ten years without losing significant capacity. However, since primary batteries typically cannot sustain high discharge rates, their use is generally limited to low discharge applications.

Secondary batteries, such as typical rechargeable batteries, may offer the ability to discharge much more rapidly than primary batteries. In addition, unlike primary batteries, rechargeable batteries may be recharged after discharge. However, secondary batteries typically have a much more limited shelf life than primary batteries. For example, a rechargeable battery may lose approximately 1-5% of battery capacity per month of storage. This loss of battery capacity may limit the shelf life of a secondary battery such as a typical rechargeable battery for various applications. After a sufficient period of time, the aggregate loss of battery capacity from secondary batteries in storage may lead to the secondary batteries having insufficient battery capacity to adequately support certain applications. For example, a fully-charged secondary battery may lose approximately 5% of its battery capacity in the first month of storage and then around 2% thereafter. In such a situation, the secondary battery may lose approximately 27% of its initial battery capacity in the first year. After 1.5 years, the secondary battery may be considered dead (e.g., having 70-80% of the original battery capacity).

Various applications may require the use of batteries that may be stored for years prior to use and yet still be able to discharge at a rapid rate. Thus there remains a significant need for a battery that both has a long shelf life and is capable of discharging at a rapid rate.

SUMMARY

The present disclosure describes devices and methods for extending the shelf life of rechargeable batteries. A primary battery, such as a lithium battery, may be used to maintain the battery capacity of a secondary battery, thereby extending the shelf life of the secondary battery. A charging system may be used to monitor one or more secondary batteries or to determine when or how to apply power from one or more primary batteries to the one or more secondary batteries. As the secondary batteries are discharged (e.g., from self-discharge), the charging system may use the one or more primary batteries to maintain a preferred state of charge (e.g., 40%, 95%) in the one or more secondary batteries. The preferred state of charge may be selected to extend the shelf-life of the rechargeable batteries. Alternatively, a signal may change the preferred state of charge to prepare the rechargeable batteries for use or for other reasons.

The one or more primary batteries, one or more secondary batteries, and charging system may be components of a hybrid battery system. The hybrid battery system may contain modular components, thereby allowing for easy replacement of defective or otherwise unsuitable non-rechargeable batteries, rechargeable batteries, or supporting electronics. The one or more primary batteries, the one or more secondary batteries, and the charging system may be integrated into one battery package or may be distributed across separate modules.

BRIEF DESCRIPTION OF THE DRAWINGS

FIG. 1 illustrates an embodiment of the disclosed hybrid battery system.

DETAILED DESCRIPTION OF THE ILLUSTRATED EMBODIMENTS

The present disclosure describes devices and methods for extending the shelf life of rechargeable batteries. A primary battery, such as a lithium battery, may be used to maintain the battery capacity of a secondary battery, thereby extending the shelf life of the secondary battery. A charging system may be used to monitor one or more secondary batteries or to determine when or how to apply power from one or more primary batteries to the one or more secondary batteries. The charging system may use the one or more primary batteries to maintain a desired state of charge (e.g., 40%, 95%) in the one or more secondary batteries. The one or more primary batteries, the one or more secondary batteries, and the charging system may be integrated into one battery package or may be distributed across separate modules.

A hybrid battery system comprising one or more secondary batteries along with one or more primary batteries to recharge the secondary batteries to maintain a sufficient level of charge may provide both a high discharge rate and extended shelf life suitable for applications that require both. For example, the hybrid battery system may utilize one or more primary batteries comprising lithium carbon monoflouride batteries to maintain one or more secondary batteries comprising lithium iron phosphate batteries at 95% battery capacity for ten years.

The hybrid battery system may comprise one or more secondary batteries that may be used to provide a high discharge rate. The hybrid battery system may further comprise one or more primary batteries that may be used to keep one or more secondary batteries floating at a desired level of charge. The hybrid battery system may further comprise a charging system that may be used to monitor one or more secondary batteries or to determine when or how to apply power from one or more primary batteries to the one or more secondary batteries. In various embodiments, the charging system may also be able to monitor the one or more primary batteries.

The one or more primary batteries may use alkaline, aluminum-air, Bunsen, chromic acid, Clark, Daniell, dry, Edison-Lalande, Grove, Leclanché, lithium, lithium carbon monoflouride, mercury, nickel oxyhydroxide, silicon-air, silver oxide, Weston, Zamboni, zinc-air, or zinc-carbon cells, or any other primary cell technology. The one or more primary batteries may utilize other battery technologies known in the art that have a high shelf life, high energy density (e.g., an energy density above 150 Wh/kg), or both. In some embodiments, the one or more primary batteries may use reserve batteries. In further embodiments, the charging system may be able to activate a mechanical or electrical trigger to activate a reserve battery.

The one or more secondary batteries may use lead-acid, alkaline, nickel-iron, nickel-cadmium, nickel-hydrogen, nickel-metal hydride, nickel-zinc, lithium-air, lithium cobalt oxide, lithium-ion polymer, lithium iron phosphate, lithium sulfur, lithium-titanate, sodium-ion, thin film lithium, zinc-bromide, zinc-cerium, vanadium redox, sodium-sulfur, molten salt, silver-oxide, or quantum cells, or any other secondary cell technology. In some preferred embodiments, the one or more secondary batteries may use a lithium iron phosphate secondary cell technology. In other embodiments, the one or more secondary batteries may use electrical storage devices that offer a high discharge rate (e.g., hypercapacitors).

The charging system may monitor the one or more primary batteries, the one or more secondary batteries, or both by measuring electrical properties of the batteries (e.g., voltage, current, resistance). In some embodiments, the monitoring may be continuous. In other embodiments, the monitoring function may be regulated by a timer function. For example, a timer function may determine according to random, periodic, or non-periodic intervals when monitoring should be performed by the charging system. The charging system may also rely on external sensor data (e.g., temperature. humidity) to adjust how often monitoring should occur. For example, if a temperature increase is detected, the charging system may increase the frequency that it monitors one or more primary or secondary batteries.

In determining when or how to apply power from the one or more primary batteries to the one or more secondary batteries, the charging system may use information obtained from monitoring the one or more primary batteries, the one or more secondary batteries, or both. The charging system may also rely on external sensor data (e.g., temperature, humidity) or on a timer function to determine when or how to apply power from the one or more primary batteries to the one or more secondary batteries.

The charging system, in determining how to apply power from the one or more primary batteries to the one or more secondary batteries, may apply power only until one or more secondary batteries reach a designated level of charge. In various embodiments, the designated level of charge may be set to full charge or a lesser value. In further embodiments, the designated level of charge may be adjustable. For example, if it is desirable to maintain the secondary batteries at 40% of full charge while in storage, but an application will need the secondary batteries at 90% of full charge, the charging system may receive a signal (e.g., by pressing of a button) that indicates that the designated level of charge should be adjusted (e.g., a level of charge optimal for storage or a level of charge optimal for a desired application). Accordingly, the charging system may then adjust the designated level of charge to a new level which may be lower or higher than the previous designated level of charge. In some embodiments, if the charging system detects that the hybrid battery system has not been used for a designated period of time (e.g., by monitoring the discharge rate or battery capacity of one or more secondary batteries), the charging system may revert to a designated level of charge optimized for storage. In some embodiments, if the charging system determines that a specific interval of time has passed since it received a signal to change to a level of charge optimized for storage, the charging system may revert to a designated level of charge optimized for a specific application. Additional examples of signals that may indicate to the charging system that the designated level of charge should be changed may include information received from a temperature sensor, a gravity sensor (e.g., if the battery system is moved), a load applied to the hybrid battery system, a message received via a network or cable connection, a calendar event, an indication of remaining capacity in the primary or secondary batteries, or a specified voltage or current draw to be supported by the battery system.

In some embodiments, the charging system may monitor the voltage of one or more secondary batteries. When a secondary battery drops below a designated voltage threshold (e.g., a voltage that represents 95% of capacity), the charging system may bring the secondary battery that is below the certain voltage threshold back to or above, by a pre-determined margin, that value by discharging the one or more primary batteries into the secondary battery. Once the secondary battery is above the designated voltage threshold, the charging system may cease discharging the one or more primary batteries into that secondary battery. The charging system may repeat the above process to use the one or more primary batteries to recharge the one or more secondary batteries at a designated voltage threshold until the one or more primary batteries are depleted. For example, by using this approach to maintain the one or more secondary batteries at a voltage level representing 95% battery capacity, the hybrid battery system may minimize usage of the one or more primary batteries. This may occur when the designated threshold voltage specified avoids fully charging the one or more secondary batteries, wherein typically faster declines of battery capacity occurs over time (e.g., 5% in the first month), in favor or a lower state of charge where battery capacity does not as quickly decline (e.g., 2% per month).

In some embodiments, the charging system may monitor various properties (e.g., voltage, current, resistance, magnetism, temperature) of one or more secondary batteries to calculate a fuel gauge that is known in the art. When a secondary battery's fuel gauge drops below a designated threshold (e.g., a value that represents 93% of capacity), the charging system may bring the secondary battery that is below the designated threshold back to or above, by a pre-determined margin, that value by discharging the one or more primary batteries into the secondary battery. Once the secondary battery is at or above the designated threshold, the charging system may cease discharging the one or more primary batteries into that secondary battery. This charging system may repeat the above process to use the one or more primary batteries to recharge the one or more secondary batteries at a designated threshold based on the fuel gauge, voltage reading, periodic time, or one or more other indicators until the one or more primary batteries are depleted.

In some embodiments, the hybrid battery system may be distributed across multiple modules or packages. For example, the one or more primary batteries and the one or more secondary batteries may be contained in separate battery packages, thereby allowing for replacement of one or more packages within the hybrid battery system as needed to replace drained or defective packages, without requiring replacement of the entire hybrid battery system. As another example, the charging system may be contained in a separate package, thereby allowing for replacement of the charging system if it is defective. In other embodiments, the hybrid battery system may be contained entirely within a single battery package.

In some embodiments, the charging system may be connected to an external power supply. When such an external power supply is connected in such embodiments, the charging system may use the external power supply instead of the one or more primary batteries whenever the charging system determines that the one or more secondary batteries require charging.

In some embodiments, the charging system may provide information or an indication (e.g., via LEDs) showing the remaining estimated shelf life, whether the hybrid battery system is at a designated state of charge, or if there is a fault within the system.

In some embodiments, the one or more primary batteries and the one or more secondary batteries of a hybrid battery system may be selected to optimize a specific shelf life, a designated total size of the hybrid battery system, a designated discharge rate, or a combination thereof.

In some embodiments, the hybrid battery system may use one or more secondary batteries for a similar purpose as described herein with respect to the one or more primary batteries. For example, if there is a failure in the one or more primary batteries, the hybrid battery system may use a subset of the one or more secondary batteries to maintain the designated level of charge for the remaining secondary batteries. Alternatively, the hybrid battery system may disconnect the one or more defective primary batteries and may use only the primary batteries still functioning properly to charge the one or more secondary batteries. As another example, if two or more secondary batteries are at different states of charge, the hybrid battery system may use a subset of those secondary batteries only (e.g., only secondary batteries with a higher state of charge than others) to even out the differences in those states of charge.

Table 1 shows an example of the watt-hour usage of a hybrid battery system over a 5 year period employing the systems and methods described above:

TABLE 1

Watt-Hour Usage over 5 Year Period
Watt-Hour Usage over a 5 Year Period

| Item | Wh | Description/calculation |
| --- | --- | --- |
| Primary Cell Power (Capacity) | 384 | 8 cells × 16 Ah × 3 V = 384 Wh (6 cells for charger, 2 cells for PIC chip) – 288 Wh for charger/96 Wh for PIC chip |
| Secondary Cell Power (Capacity) | 208 | 52 cells × 1.25 Ah × 3.2 V = 208 Wh |
| Self Discharge Primaries (Loss) | 28.8 | 1.5% per year: 384 Wh × 1.5% × 5 yr = (21.6 Wh for charger, 7.2 Wh for PIC chip) |
| Self Discharge Secondaries (Loss) | 124.8 | 1% per month: 208 Wh × 1% × 60 months = 124.8 Wh |
| Charge Efficiency (Loss) | 72 | 75% efficient: 6 cells for charger (0.25 × 288 Wh) |
| Protection Fets (Loss) | 0 | assuming off >99% of time with external switch |
| Seiko Chips (Loss) | 39.42 | measured 5 uA per hour: 5 uA × 3.6 V × 24 hr × 365 day × 5 yr × 50 chips =39.42 Wh |
| Useable Primary Power for Charger (Capacity) | 194.4 | primary – self discharge – efficiency = 288 (6 cells) – 21.6 – 72 = 194.4 Wh |

TABLE 1-continued

Watt-Hour Usage over 5 Year Period
Watt-Hour Usage over a 5 Year Period

| Item | Wh | Description/calculation |
| --- | --- | --- |
| Secondary Losses (Total) Wh | 164.22 | self discharge + Seiko chip circuitry = 124.8 + 39.42 = 164.22 |
| Excess Capacity for Charger | 30.18 | usable primary power for charging – secondary losses = 194.4 Wh – 164.22 Wh |
| Useable Primary Power for PIC Chip (Capacity) | 88 | 2 cells × 16 Ah × 3 V – 7.2 Wh = 88.8 Wh |
| Regulator Function (Loss) | 26.28 | 100 uA × 6 V × 24 × 365 × 5 = 26.28 Wh |
| Sleep Function (Loss) | 32.85 | 50 uA × 15 V × 24 × 365 × 5 = 32.85 Wh |
| Excess Capacity for PIC Chip/Regulator | 28.87 | 88 Wh – 26.28 Wh – 32.85 Wh = 28.87 Wh |

As shown in Table 1, a hybrid battery system may contain a set of eight primary batteries to form a primary cell power. The batteries within the primary cell power may each provide a nominal voltage of 3 V and a nominal capacity of 16 amp-hours at a C-Rate in accordance with the primary batteries' specification. Accordingly, the primary cell power may have a total energy capacity of 384 watt-hours. Two of the primary batteries may be reserved for powering a programmable interface chip that may be used to provide the charging system, while the remaining six primary batteries may be used to charge secondary batteries within the hybrid battery system. In some embodiments, the charging system may determine on an as-needed basis the use of each primary battery. For example, at one point in time the charging system may use a first subset of primary batteries to provide power to the charging system and use a second subset of primary batteries for charging secondary batteries. Then at another point in time the charging system may use a new arrangement of a third subset of primary batteries to provide power to the charging system and use a fourth subset of primary batteries for charging secondary batteries, wherein the first and second subset differ from the third and fourth subset in terms of which primary batteries have been selected.

The hybrid battery system may further contain a set of 52 secondary batteries to form a secondary cell power. The batteries within the secondary cell power may each provide a nominal voltage of 3.2 V and a nominal capacity of 1.25 amp-hours at a C-Rate in accordance with the secondary batteries' specification. Accordingly, the secondary cell power may have a total energy capacity of 208 watt-hours.

During a state of storage lasting 5 years for this example hybrid battery system, the primary batteries may self-discharge at a rate of 1.5% per year, resulting in a loss of 21.6 watt-hours over 5 years for the primary batteries reserved for charging the secondary batteries and a loss of 7.2 watt-hours over 5 years in the primary batteries reserved for operating the programmable interface chip (i.e., a total of 28.8 watt-hours over 5 years due to the self-discharge of the primary batteries). The secondary batteries of this example hybrid battery system may self-discharge at a rate of 1% per month, which would result in a loss of 124.8 watt-hours over 5 years. Additional losses may be incurred via any inefficiency in the charging of the secondary batteries by the primary batteries. For instance, the example hybrid battery system may only be 75% efficient, which would result in a maximum loss of 72 watt-hours if the six primary batteries used to charge secondary batteries within the hybrid battery system were fully discharged to maintain the secondary batteries. Other losses may arise from protection circuitry, but such loss may be negligible over a 5 year storage period. Further losses may arise from integrated circuits that may be utilized in the example hybrid battery system for various functions, such as those manufactured by Seiko Instruments, Inc., which may result in a loss of about 40 watt-hours over a 5 year period.

Given the above losses over a 5 year period, the example hybrid battery system would have 194 watt-hours of energy capacity in the primary batteries for charging the secondary batteries (i.e., 288 watt-hours from six primary batteries minus the 21.6 watt-hour loss from self-discharge of these six primary batteries and a loss of a 72 watt-hours due to possible charging inefficiencies). During the 5 year period, the secondary batteries in the example hybrid battery system would lose 164.22 watt-hours (i.e., 124.8 watt-hours due to self-discharge of the secondary batteries and 39.42 watt-hours from integrated circuits used with the secondary batteries). Accordingly, the primary batteries used in this example hybrid battery system can maintain the state of charge of the secondary batteries within such a system for 5 years and still have an excess usable energy capacity of 30.18 watt-hours to further charge the secondary batteries.

With respect to the two primary batteries reserved for powering a programmable integrated chip, usable primary power for such a chip would consist of 88.8 watt-hours (i.e., 96 watt-hours from two primary batteries minus 7.2 watt-hours from self-discharge of these two batteries). The operation of the programmable interface chip and related circuitry may result in losses of 26.28 watt-hours due to regulating functions and 32.85 watt-hours due to sleep functions over the 5 year period. This leaves an excess usable energy capacity of 28.87 watt-hours in the two primary batteries reserved for the programmable interface chip, which may be used to further maintain the example hybrid battery system or other functions.

The above example hybrid battery system thus demonstrates one possible approach for extending the shelf life of rechargeable batteries for a period of 5 years using the disclosures provided herein.

FIG. 1 shows an embodiment 100 of the disclosed hybrid battery system. Hybrid battery system 100 may include primary batteries 102 that are contained within a primary battery pack 104, a charging system 106, and secondary batteries 108 that are contained within a secondary battery pack 110. The charging system may be connected to an external power supply 112, a display 114, and sensors 116. In some embodiments, display 114 may be an LED display. The LED display may show the remaining estimated shelf life, whether the hybrid battery system is at a designated state of charge, whether there is a fault within the system, or other pertinent information. In some embodiments, the sensors 116 may include a temperature sensor, a humidity sensor, a gravity sensor, a load sensor, or a sensor that determines voltage (e.g., a voltmeter), current (e.g., an ammeter), resistance, or magnetism. The primary batteries and primary battery pack may be connected to the charging system via a primary battery interconnect 118. The secondary batteries and secondary battery pack may be connected to the charging system via a secondary battery interconnect 120. Interconnects 118 and 120 may connect the charging system 106 to primary battery pack 104 and primary batteries 102 and secondary battery pack 110 and secondary batteries 108 respectively, so as to allow charging, discharging, monitoring, or other functions disclosed herein performed between the charging system and the primary or secondary batteries. All components of the system may be enclosed in a battery housing 122.

The disclosure and examples above are intended to be illustrative and are not intended to limit or otherwise restrict the invention. Numerous variations and modifications will become apparent to those skilled in the art upon full appreciation of the above disclosure, and the generic principles defined herein may be applied to other embodiments without departing from the spirit or scope of the disclosure.

For example, one skilled in the art will understand that the components and other features described herein, for example in relation to charging system, can be implemented as discrete hardware components or integrated in the functionality of hardware components such as ASICS, FPGAs, DSPs or similar devices. In addition, one skilled in the art will understand that these components can be implemented as firmware or functional circuitry within hardware devices. Further, one skilled in the art will understand that these components can be implemented in any combination of hardware devices and software components.

Thus, the present disclosure is not intended to be limited to the embodiments shown herein but is to be accorded the widest scope consistent with the principles and novel features disclosed herein and with the scope and spirit of the appended claims.

All references cited herein are expressly incorporated by reference.

What is claimed is:

1. A method of extending the shelf-life of rechargeable batteries using a hybrid battery system comprising:
   monitoring via a charging system a first set of state of charge for a set of primary batteries, wherein the set of primary batteries are non-rechargeable;
   monitoring via the charging system a second set of state of charge for a set of secondary batteries, wherein the set of secondary batteries are rechargeable;
   charging the set of one or more secondary batteries to maintain a first state of charge level via the charging system using the set of one or more primary batteries;
   determining if an adjustment in charge of the set of one or more secondary batteries is required via the charging system based on information or signals received by the charging system relating to a specified current draw to be supplied from the one or more secondary batteries, a message received from a network connection, or data from a humidity sensor; and
   if an adjustment instruction is generated by the charging system based on the determination, adjusting the charge of the set of one or more secondary batteries via the charging system to maintain a second state of charge level using the set of one or more primary batteries.

2. The method of claim 1 further comprising displaying information or an indication showing a remaining estimated shelf life, whether a hybrid battery system is at a designated state of charge level, or if there is a fault within a hybrid battery system.

3. The method of claim 1 further comprising determining, based on the first set of state of charge a charging set of primary batteries to be used for charging, wherein the charging set of primary batteries is a subset of the set of primary batteries, and using only the charging set of primary batteries to charge the secondary batteries.

4. The method of claim 1, wherein determining if an adjustment in charge of the set of one or, more secondary batteries is required via the charging system further includes information relating to the press of a button.

5. The method of claim 1, wherein determining if an adjustment in charge of the set of one or more secondary batteries is required via the charging system further includes information relating to non-use of the secondary batteries for a designated period of time.

6. A method of extending the shelf-life of rechargeable batteries using a hybrid battery system comprising:
monitoring via a charging system a first set of state of charge for a set of primary batteries, wherein the set of primary batteries are non-rechargeable;
monitoring via the charging system a second set of state of charge for a set of secondary batteries, wherein the set of secondary batteries are rechargeable;
charging the set of one or more secondary batteries to maintain a first state of charge level via the charging system using the set of one or more primary batteries or if an external power supply is coupled to the charging system, charging the set of one or more secondary batteries using the external power supply rather than the set of one or more primary batteries;
determining if an adjustment in charge of the set of one or more secondary batteries is required via the charging system based on information or signals received by the charging system; and
if an adjustment instruction is generated by the charging system based on the determination, adjusting the charge of the set of one or more secondary batteries via the charging system to maintain a second state of charge level using the set of one or more primary batteries.

7. The method of claim 6 further comprising displaying information or an indication showing a remaining estimated shelf life, whether a hybrid battery system is at a designated state of charge level, or if there is a fault within a hybrid battery system.

8. The method of claim 6 further comprising determining based on the first set of state of charge a charging set of primary batteries to be used for charging, wherein the charging set of primary batteries is a subset of the set of primary batteries, and using only the charging, set of primary batteries to charge the secondary batteries.

9. The method of claim 6, wherein determining if an adjustment in charge of the set of one or more secondary batteries is required via the charging system further includes information relating to the press of a button.

10. The method of claim 6, wherein determining if an adjustment in charge of the set of one or more secondary batteries is required via the charging system further includes information relating to non-use of the secondary batteries for a designated period of time.

11. A method of extending the shelf-life of rechargeable batteries using a hybrid battery system comprising:
monitoring via a charging system a first set of state of charge for a set of primary batteries, wherein the set of primary batteries are non-rechargeable;
monitoring via the charging system a second set of state of charge for a set of secondary batteries, wherein the set of secondary batteries are rechargeable;
charging the set of one or more secondary batteries to maintain a first state of charge level via the charging system using the set of one or more primary batteries;
determining if an adjustment in charge of the set of one or more secondary batteries is required via the charging, system based on information or signals received by the charging system;
if an adjustment instruction is generated by the charging system based on the determination, adjusting the charge of the set of one or more secondary batteries via the charging system to maintain a second state of charge level using the set of one or more primary batteries; and
if the set of one or more primary batteries is depleted, using a first subset of the one or more secondary batteries to charge a second subset of the one or more secondary batteries.

12. The method of claim 11 further comprising displaying information or an indication showing a remaining estimated shelf life, whether a hybrid battery system is at a designated state of charge level, or if there is a fault within a hybrid battery system.

13. The method of claim 11 further comprising determining based on the first set of state of charge a charging set of primary batteries to be used for charging, wherein the charging set of primary batteries is a subset of the set of primary batteries, and using only the charging set of primary batteries to charge the secondary batteries.

14. The method of claim 11, wherein determining if an adjustment in charge of the set of one or more secondary batteries is required via the charging system further includes information relating to the press of a button.

15. The method of claim 11, wherein determining if an adjustment in charge of the set of one or more secondary batteries is required via the charging system further includes information relating to non-use of the secondary batteries for a designated period of time.

* * * * *